Patented Mar. 7, 1933

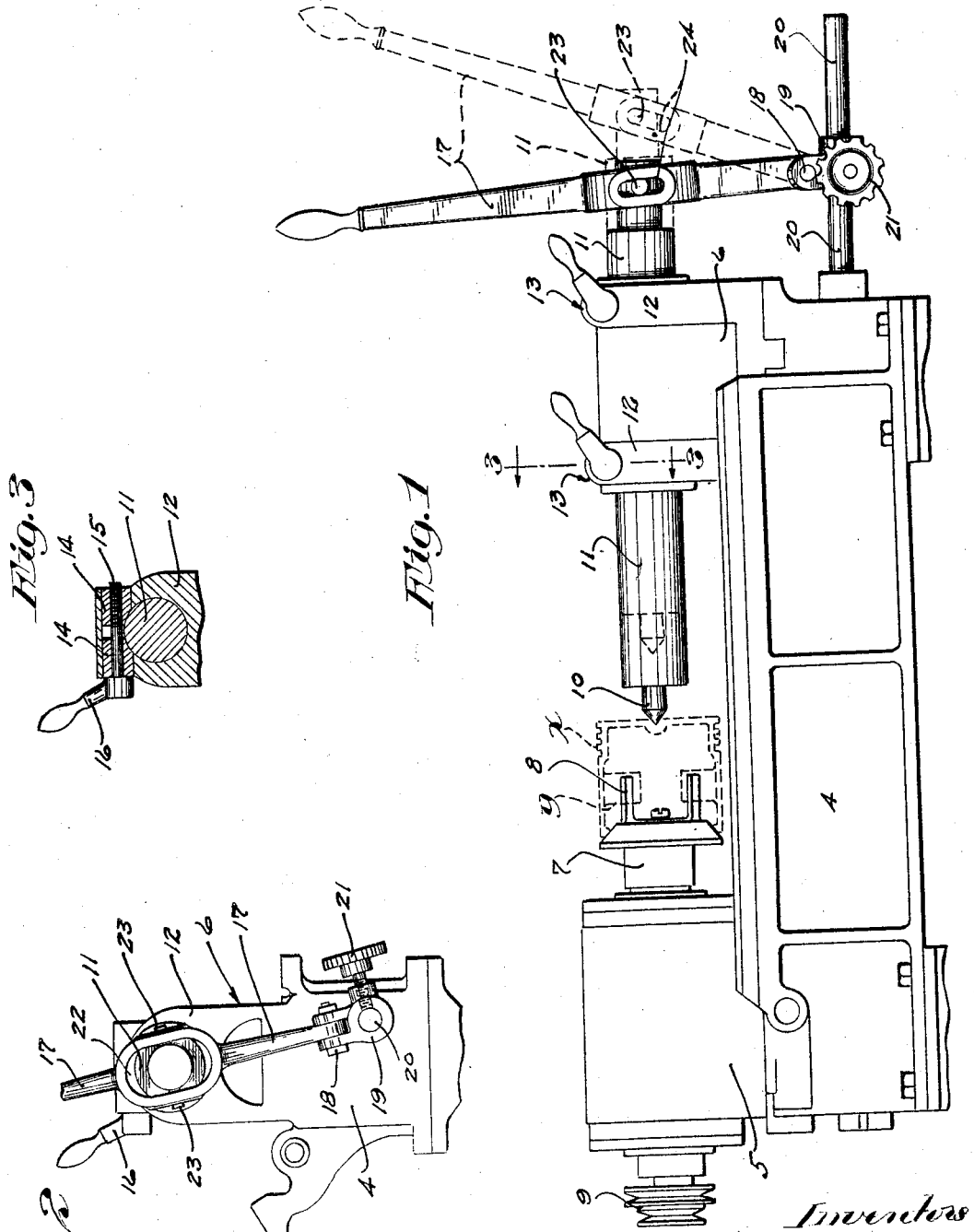

1,900,261

UNITED STATES PATENT OFFICE

ADOLPH STORM AND THOR THORSEN, OF MINNEAPOLIS, MINNESOTA, ASSIGNORS TO STORM MANUFACTURING CO., INC., OF MINNEAPOLIS, MINNESOTA, A CORPORATION OF MINNESOTA

LATHE DEAD CENTER ACTUATING DEVICE

Application filed February 18, 1931. Serial No. 516,649.

Our present invention relates to lathes, grinders and like machines, intended for general use, but especially to such machines designed for turning, grinding and otherwise finishing pistons for internal combustion engines and other cylindrical bodies, and having a live center in the form of a truncated cone provided with a driving dog.

This form of live center is adapted to be engaged by the outer edge of the skirt of a piston, with freedom to permit self-adjustment of the piston thereon, to center itself in respect to the dead center, and be held thereon by said dead center. The function of this driving dog is to cause the piston to rotate with the live center, and which dog is relatively long, extends axially from the live center toward the dead center, and arranged to extend into the piston for engagement with the internal bosses, which surround the diametrically opposite seats in the piston for its wrist pin.

To mount a piston on such a live center, requires a long axial movement of the piston to insert the driving dog therein for contact with its bosses, or to remove the same therefrom. In order to impart this long axial movement to a piston to apply the same to the live center, or remove therefrom, it is necessary to position the dead center a relatively long distance from the live center.

The primary object of this invention is to provide a dead center mounting and operating device therefor, that can be moved very quickly to and from an operative position in which it engaged the head of the piston, and hold the skirt thereof against the live center.

The above end, generally stated, the invention consists of the novel devices and combinations of devices hereinafter described in the claims.

In the accompanying drawing, which illustrates the invention, like characters indicate like parts throughout the several views.

Referring to the drawing:

Fig. 1 is a fragmentary front elevation of a lathe having the invention embodied therein, some parts being shown in different positions by means of broken lines;

Fig. 2 is a right hand elevation of the parts shown in Fig. 1; and

Fig. 3 is a fragmentary detail view, principally in section taken on the line 3—3 of Fig. 1.

The invention as illustrated is embodied in a lathe especially designed for finishing pistons, and of certain parts thereof the numeral 4 indicates the bed, 5 the headstock, 6 the tailstock, 7 the live center, 8 the driving dog, and 9 the pulley which forms a part of the driving mechanism for said live center. Said live center 7 is in the form of a truncated cone, and the driving dog 8 is in the form of a U, pivoted at its transverse portion to said live center at the axis thereof, with its prongs, which are relatively long, projecting toward the dead center 10.

A piston "X", diagrammatically illustrated by means of broken lines, is held in the lathe by the centers 7 and 10. It will be noted that the outer edge of the skirt of the piston "X" is pressed against the live center 7 by the dead center 10, the conical point of which extends into a seat, therefor, in the head of said piston. It will also be noted that the prongs of the driving dog 8 extend into the piston "X" and engage its internal bosses "Y", which surround the seats therein for a wrist pin, not shown, to cause said piston to turn with the live center 7.

Referring now in detail to the invention, which provides a mounting for the dead center 10 and an actuating mechanism therefor. The dead center 10 is mounted in the inner end of a long cylindrical bar 11 at the axis thereof, and said bar is mounted for end-wise sliding movement in front and rear bearings 12, formed in the tailstock 6.

Two clamps 13 are provided, one at each bearing 12, for rigidly securing the bar 11 in different longitudinal adjustments to the tailstock 6. Each clamp 13 comprises a pair of axially spaced and axially aligned cylindrical wedges 14, mounted on a rod 15 having on one end a crank-acting handle 16. The pairs of the wedges 14 are mounted in cylindrical seats in the tops of the bearings 12 for end-wise movement toward and from each other, transversally of the bar 11. Each pair of wedges 14 is arranged to impinge against opposite sides of the bar 11,—see Fig. 3. The rod 15 has screw threaded engagement with the outer wedge 14, and the inner wedge 14 is loose on said rod and engages the hub of the handle 16 as a base of resistance. By screwing the rod 15 into the outer wedge 14, the wedges 14 will be frictionally clamped onto the bar 11 and connect the same to the tailstock 6.

The actuating device, for end-wise sliding the bar 11 in the bearing 12, to move the dead center 10 axially toward or from the live center 7, includes an upright hand lever 17, the lower end of which is fulcrumed at 18 to a sliding collar 19. This collar 19 is slidably mounted on a horizontal rod 20 to shift the fulcrum for the hand lever 17 toward or from the live center 7. Said rod 20 is rigidly secured to the right hand end of the bed 4 in a position in which it is parallel to the bar 11. A set screw 21 is provided for rigidly securing the collar 19 to the rod 20 in different longitudinal adjustments, and which screw has threaded engagement with the collar 19 and impinges against the rod 20.

The lever 17, intermediate of its ends, is transversally expanded and provided with a large vertically elongated eye 22 through which the reduced rear end portion of the bar 11 loosely extends. Said lever 17 is connected to the bar 11 by a pin 23 which extends transversally through said bar and into vertical slots 24 in the sides of the lever 17. This slip connection 23—24 permits the required reciprocatory movement of the lever 17, and the straight line sliding movement of the bar 11, without placing any lateral strain on said bar. The purpose of reducing the diameter of the bar 11 at its connection with the lever 17 is to keep said connection as compact as possible, and at the same time permit the required throw of the lever 17.

A single stroke of the hand lever 17 to the left will project the bar 11 and set the dead center 10 in an operative position, as shown by full lines in Fig. 1, and a reverse single stroke of said lever will retract the bar 11 and set the dead center 10 in an inoperative position, as shown by broken lines in Fig. 1. This retracting movement of the bar 11 is sufficient to leave a gap between the prongs of the driving dog 8 and dead center 10 through which the piston "Y" may be moved laterally to mount the same on the centers 7 and 10 or remove the same therefrom.

To adjust the actuating device for the dead center 10 to pistons of different lengths, the fulcrum 18 may be very quickly moved toward or from the live center 7 by longitudinally adjusting the collar 19 on the rod 20. To release the dead center 10 from the piston "X", it is only necessary to swing the two handles 16 in a direction to operate the clamps 13 and release the bar 11, and thereafter move the lever 17 rearward to retract said dead center.

From what has been said, it will be understood that the invention described is capable of modifications as to details of construction and arrangement within the scope of the invention herein disclosed and claimed.

What we claim is:

1. In a machine of the class described, a sleeve-like bearing, a round bar mounted in the bearing with freedom for axial sliding movement and for turning movement about its longitudinal axis, frictional clamping means for rigidly securing the bar to the bearing, a round rod rigidly secured to a relatively fixed support and extending parallel to the bar, a sliding collar mounted on the rod with freedom to turn about its axis, frictional clamping means for rigidly securing the collar to the rod, a hand-lever, one end of which is fulcrumed to the collar, and a slip connection between the lever and outer end of the bar.

2. In a machine of the class described, a sleeve-like bearing, a bar mounted in the bearing for axial sliding movement, means for rigidly securing the bar to the bearing, a rod rigidly secured to the bearing and extending parallel to the bar, a sliding collar mounted on the rod, means for rigidly securing the collar to the rod, a hand-lever, one end of which is fulcrumed to the collar, and a slip connection between the lever and the outer end of the bar.

In testimony whereof we affix our signatures.

ADOLPH STORM.
THOR THORSEN.